Sept. 13, 1960       C. J. FLETCHER ET AL       2,952,422
ANNULAR WING AIRCRAFT

Filed Aug. 3, 1955                               4 Sheets-Sheet 1

Raymond A Fletcher
Charles J Fletcher
INVENTORS

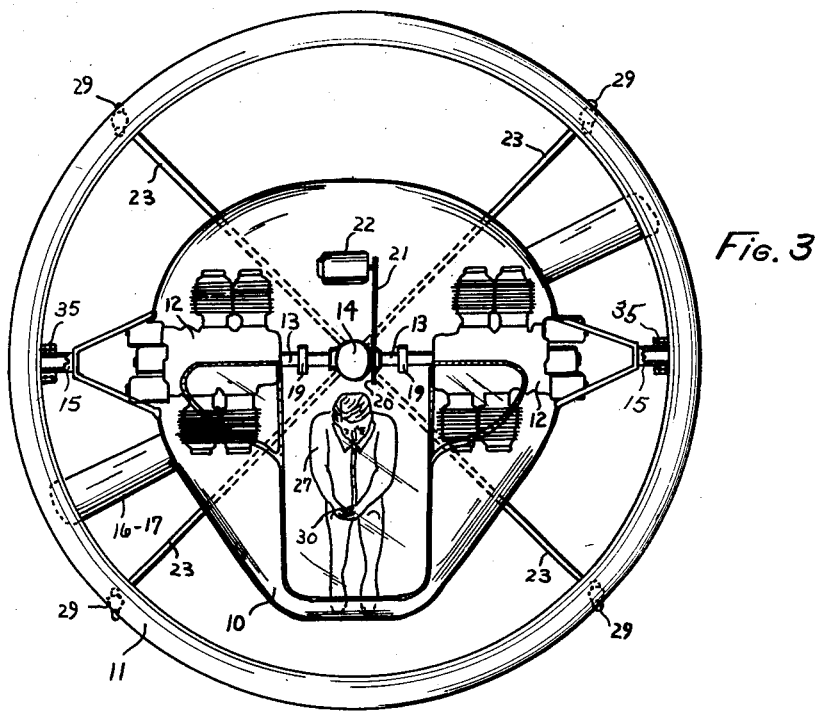
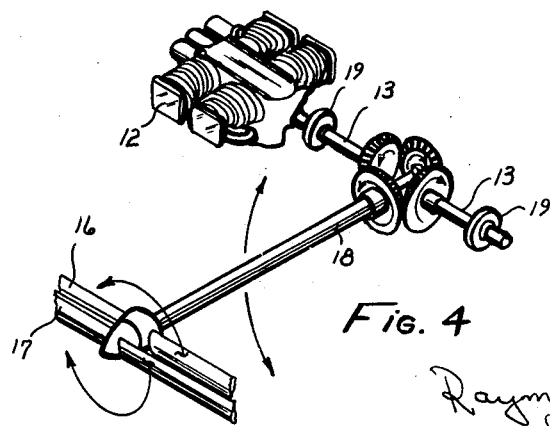

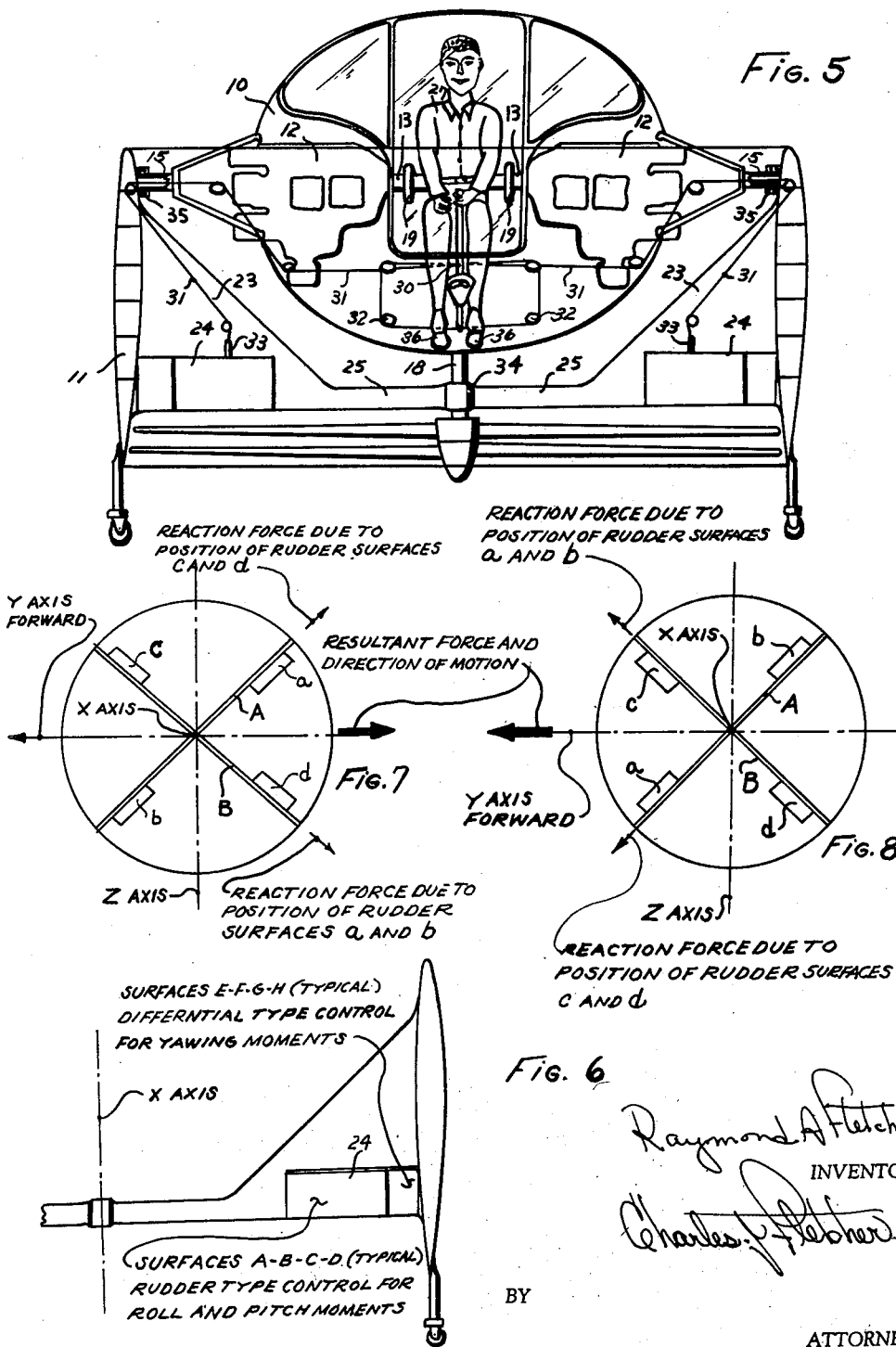

Sept. 13, 1960     C. J. FLETCHER ET AL     2,952,422
ANNULAR WING AIRCRAFT
Filed Aug. 3, 1955
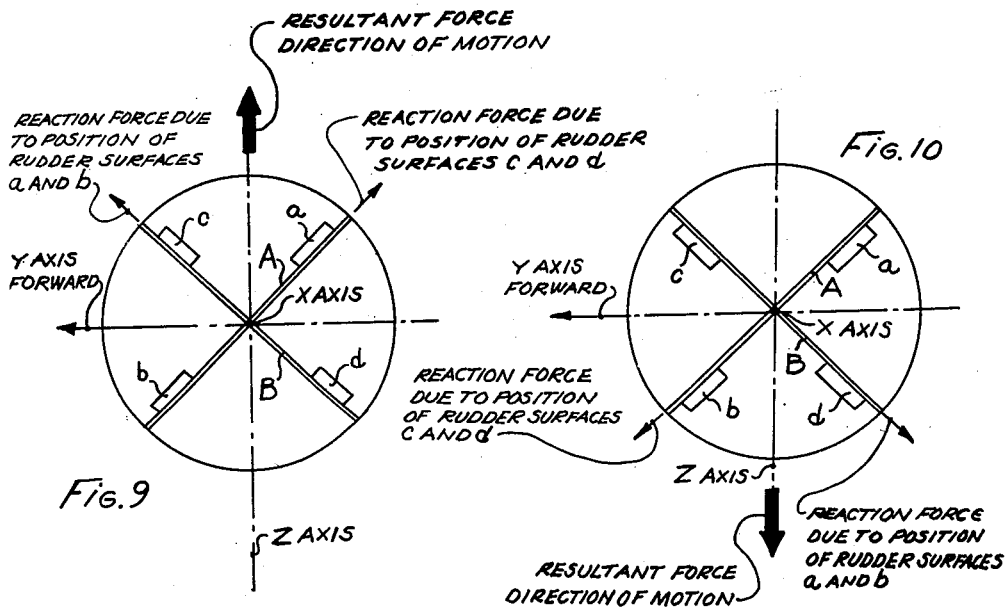
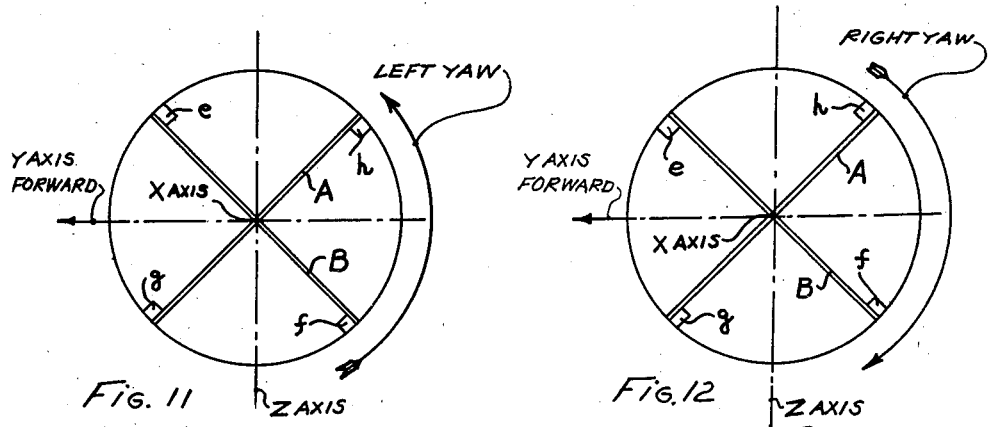

United States Patent Office 2,952,422
Patented Sept. 13, 1960

2,952,422
ANNULAR WING AIRCRAFT

Charles J. Fletcher and Raymond A. Fletcher, Franklin, N.J., assignors to Fletch-Aire Company, Inc., Sparta, N.J., a corporation of New Jersey Filed Aug. 3, 1955, Ser. No. 526,144

13 Claims. (Cl. 244—12)

This invention relates to improvements for a vertical rising aircraft of the annular wing type.

Heretofore, various devices have been provided for annular wing aircraft designed to accommodate a pilot standing on an annular platform wing.

Still other types provide for an annular wing fixed to the fuselage which requires the pilot and passengers to pivot through an arc of approximately niney degrees during translation from vertical to horizontal flight.

In either of the above cases no arrangement is provided wherein the annular wing pivots about a spherical shaped fuselage to provide a compact system to accomplish vertical flight as a helicopter or high speed flight as a conventional aircraft.

The principal object of this invention therefore is to provide a unique annular wing type aircraft of new and novel arrangements embodying interconnecting moving or stationary parts, wherein the fuselage is substantially of spherical shape and surrounded with a pivotally mounted annular wing ducted propeller combination for accomplishing both vertical and horizontal flight.

Another object of this invention is to provide for an aircraft having a generally spherical shaped fuselage, surrounded by a pivotally mounted annular wing-ducted propeller combination, whereby the spherical shaped fuselage assures a smooth laminal flow through the annular wing for improving thrust augmentation.

Another object of this invention is to permit the conversion from vertical to horizontal flight without subjecting the pilot to a rotating motion.

Still another object of this invention is to provide an aircraft having a fixed power system within the fuselage capable of driving a rotor system which pivots in unity with an annular type wing.

Another object of this invention is to provide for an aircraft comprising a pivotally mounted annular wing-ducted propeller combination which provides for a minimum center of gravity travel during translation from vertical to horizontal flight.

Another object of this invention is to provide for a more responsive aircraft by controlling the pivotally mounted annular wing-ducted fan combination in such a manner as to direct the generated thrust forces in the direction best suited for a given flight condition.

Still another object of this invention is to provide an aircraft of greater strength weight ratio by use of spherical and circular shaped structure.

Another object of this invention is to provide for an aircraft having a greater thrust to weight ratio by utilizing the ducted propeller principle.

Still another object of this invention is to provide for an aircraft wherein the resultant thrust force generated by the annular wing ducted propeller combination passes through a point substantially close to the aircraft center of gravity regardless of the position of the annular ring.

Still another object of this invention is to provide for an aircraft, wherein the center of pressure of the annular wing and the center of gravity of the aircraft lie substantially in a plane transverse to the longitudinal axis of said aircraft when the wing is in the horizontal or forward flight position.

Still another object of this invention is to provide for an aircraft, having twin engine reliability.

Still another object of this invention is to provide for an aircraft which in general will be simple, inexpensive and of rugged construction to minimize initial cost and maintenance.

Still another object of this invention is to provide for an aircraft that can operate safely in and out of extremely confined areas.

Still another object of this invention is to provide for an aircraft that will be inherently stable and therefore easy to fly with relatively little training.

Still another object of this invention is to provide for an aircraft comprising a pivotally mounted annular wing-ducted propeller combination, wherein the annular wing and propeller drive system pivots about a common axis.

To date considerable research has been completed on annular wings and in the interest of clarity the following references are offered to provide those interested with a background for realizing the high potential of an aircraft of this type.

(1) Erdmann, S. F. and Oswatitsch, K. Zeitschrift für Fleigwissenscaften No. 8, 1954.

(2) Plaskowski, Z., report on Annular Wings, presented to the Fourth International Astronautical Congress, Zurich, August 5, 1953.

These and other objects of the invention will be apparent by referring to the following specifications and accompanying drawings, wherein, Fig. 1 shows a side view of the aircraft with the annular wing positioned in the vertical flight position.

Fig. 3 shows a top view of the aircraft with the annular wing in the vertical flight position.

Fig. 4 shows a typical power plant and drive system.

Fig. 5 shows front view of the aircraft including the flow path of the control cables to the wing.

Fig. 6 shows a typical assembly of the rudder and aileron control surfaces positioned within the annular wing.

Fig. 7 shows a schematic of control forces and rudder positions to achieve a rearward pitching moment about the Z axis with the wing positioned in the vertical flight position.

Fig. 8 shows a schematic of the control forces and rudder positions to achieve a forward pitching moment about the Z axis with the wing positioned in the vertical flight position.

Fig. 9 shows a schematic of the control forces and rudder positions to achieve a right rolling moment about the Y axis with the wing positioned in the vertical flight position.

Fig. 10 shows a schematic of the control forces and rudder positions to achieve a left rolling moment about the Y axis with the wing positioned in the vertical flight position.

Fig. 11 shows a schematic of the aileron positions to achieve a left yaw about the X axis with the wing positioned in the vertical flight position.

Fig. 12 shows a schematic of the aileron positions to achieve a right yaw about the X axis with the wing positioned in the vertical flight position.

Figure 1:
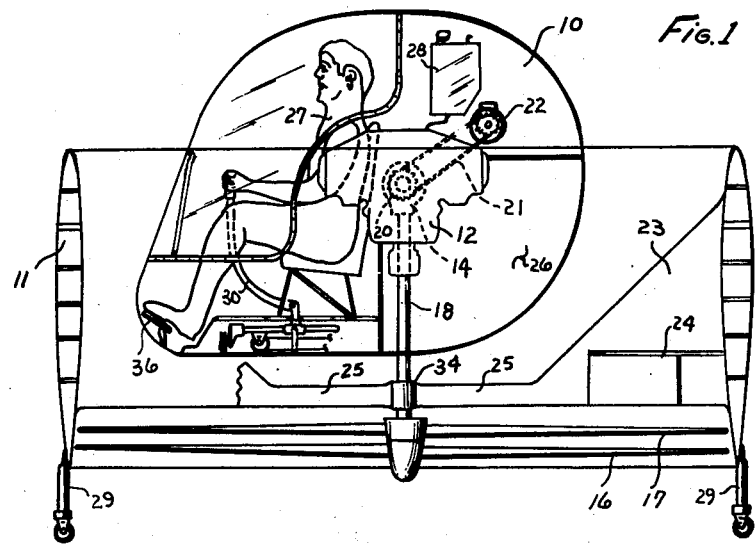

Referring more particularly to the drawings wherein similar reference characters designate like parts throughout the several views, a fuselage 10 is shown of substantially spherical construction surrounded by a pivotally mounted annular wing 11.

The distribution of the working components are best illustrated in Fig. 3, wherein two power plants 12 are shown symmetrically disposed on the lateral axis. The drive shaft 13 of each power plant 12 extends inward to the central portion of the fuselage 10 and drives a pivotally operated transmission 14 which in turn couples a pair of counter rotating rotors 16 and 17, respectively, by means of a dual rotor shaft 18. Drive shaft clutches 19 are positioned at an intermediate point between the power plant 12 and transmission 14 to permit single power plant operation in the event of an engine failure.

The transmission 14 is provided with a fixedly mounted sprocket 20 which is driven by a chain 21 communicating with and mechanically driven by a small motor 22 for purposes hereinafter described.

The annular wing 11 is pivotally mounted on the fuselage 10 by hollow shafts 15 mounted on a bearing assembly 35 of annular wing 11 having a rotational axis co-axial with respect to the rotational axis of the transmission 14.

Referring now to Fig. 1 the annular wing 11 is provided with four symmetrically disposed internal fins 23 each provided with a control surface 24. The lower central portion of the fins 23 each provide a radial support arm 25 which forms a bearing support 34 for supporting the outboard end of dual rotor shaft 18. The latter structure permits the annular wing 11, fins 23, and support arms 25 to pivot on wing bearing assemblies 35 substantially ninety degrees in a counterclockwise manner outside the periphery of the spherical shaped fuselage 10 from vertical to horizontal flight. The dual rotor shaft 18 is permitted to pivot in unity with the annular wing 11 by passing through a slot 26 positioned centrally in the lower rear quadrant of the fuselage 10 (see Figure 2).

Once the pilot 27 takes off vertically, the motor 22 provides a means for operating the chain 21 and sprocket 20 which pivots the transmission 14 and annular wing 11 in unity to produce a relative angular displacement between the annular wing 11 and fuselage 10.

Fuel tank 28 positioned near the upper central portion of the fuselage 10 supplies fuel to the power plants 12 under the force of gravity.

Annular wing 11 is provided with four landing wheels 29 symmetrically positioned at the trailing edge.

The system employed to permit the pilot 27 to achieve effective aerodynamic control of the aircraft described herein operates as follows:

Figure 5 shows a typical flow path of one of several control cables 31 used to actuate the adjacently mounted rudder and aileron control surfaces 24 pivotally mounted at the lower end of each fin 23. These cables are attached to a conventional control stick 30 and rudder pedals 36 and ride on a series of pulley assemblies 32. As can be seen the cables 31 are permitted to pass through the annular wing hollow shafts 15, annular wing 11, and fins 23 to control horns 33 mounted to the control surfaces 24. Such an arrangement allows the control cables 31 to pivot on an axis co-axial with respect to the wing pivoting axis. As a result the cables 31 are subjected to a minimum of stress or strain during transitional flight.

Figure 6 represents one of four typical fin and control assemblies operated by the pilot 27 to provide effective control about the three principal axes. As shown each control surface 24 is divided into two sections 24a and 24b. The inboard section is coupled to the stick control 30 to achieve pitching and rolling moments. The outboard sections are coupled to the rudder pedals 36 to achieve yaw moments. For purposes of clarity Figures 7 through 12 represent the wing in the vertical flight position. As the wing assumes the forward flight position it becomes quite obvious that the same method of control will be adequate to control the aircraft in the conventional manner.

Referring now to the drawings, Z represents the lateral axis of the annular wing 11 about which pitching moments occur in the vertical flight attitude; Y represents the longitudinal axis of the annular wing 11 about which rolling moments occur in the vertical flight attitude; and X represents the vertical axis of the annular wing 11 about which yawing moments occur in the vertical flight attitude.

Figures 7 through 10 show a detailed analysis of the deflected rudder positions with respect to each fin structure axes A and B including their generated control forces. Rudder control surfaces $a$ and $b$ are rigged as an integral control assembly so as to deflect together to either side of fin structure axis A, and rudder control surfaces $c$ and $d$ are rigged so as to deflect together to either side of structural axis B. As indicated by the drawings, Figure 7 shows how a rearward pitching moment about the Z axis is accomplished. Figure 8 shows how a forward pitching moment about the Z axis is accomplished. Figure 9 shows how a right rolling moment about the Y axis is accomplished, and Figure 10 shows how a left rolling moment about the Y axis is accomplished.

Figures 11 and 12 show a detailed analysis of the deflected aileron positions with respect to each fin structure axis A and B to accomplish yaw control about the X axis. In this control arrangement aileron (differential) control surfaces $e$ and $f$ are coupled together as an integral control assembly to deflect to opposite sides of fin structural axis B. Similarly, control surfaces $g$ and $h$ are coupled together to deflect to opposite sides of fin structure axis A.

Figures 11 and 12 specifically show the deflected positions of the aileron surfaces and force couples to achieve either a left or right yaw moment about the vertical axis X.

Figure 2:
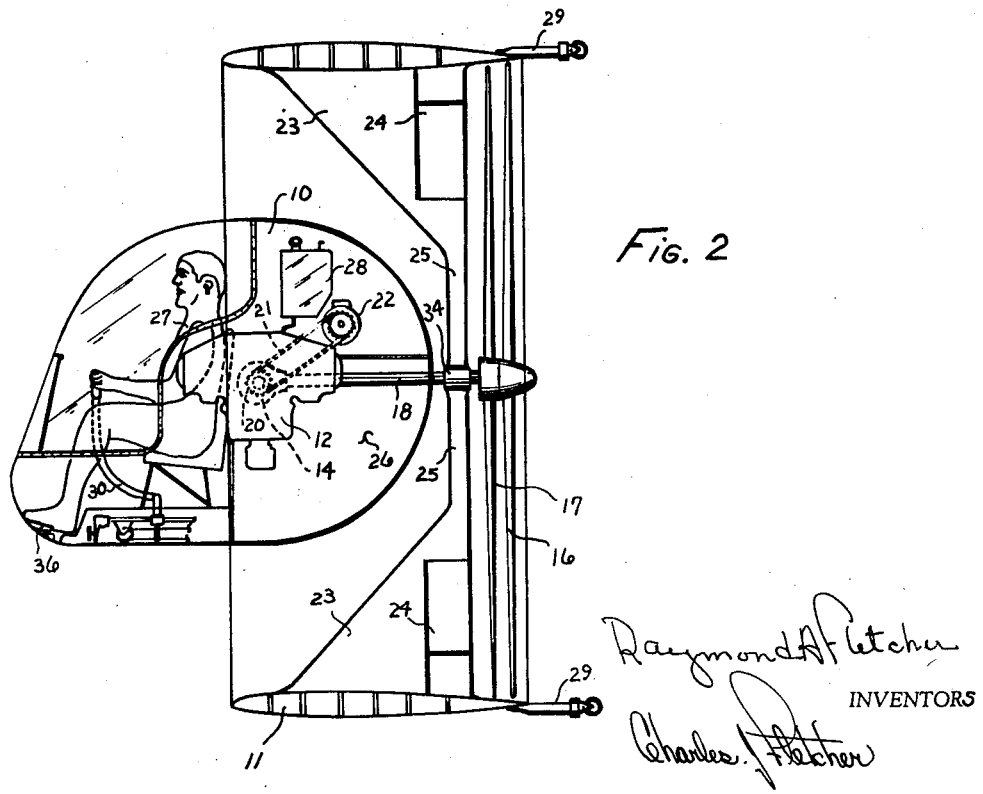
Fig. 2 shows a side view of the aircraft with the annular wing in the full forward flight position.

As can be seen best in Fig. 1 or 2 the lower forward portion of the fuselage 10 provides for a protruding portion to accommodate the feet of the pilot 27. As the annular wing 11 pivots into a horizontal position, the air flow through the annular wing 11 acts on the protruding section forcing the fuselage to pivot counterclockwise. The latter action provides a unique means of counterbalancing the forces tending to pitch the fuselage 10 upward during rotation of annular wing 11.

It shall be understood that the above illustrations and descriptions of the construction and arrangements of interconnecting moving and stationary parts form a typical configuration embodying new and salient features hereinafter claimed of the invention, but that modifications may be made to the construction and parts hereto without departing from the spirit of the invention.

What we claim is:

1. An aircraft comprising a fuselage, a tubular wing pivotally mounted on and surrounding said fuselage, a rotor system housed within said wing for creating a blast of air therethrough, and power means in said fuselage for driving said rotor system, said wing and said rotor system being pivotally mounted with respect to said fuselage on a common pivot axis and said pivot axis being disposed transversely to the axis of symmetry of said wing, whereby said wing and said rotor system may pivot as a unit with respect to said fuselage about said common axis.

2. An aircraft comprising a fuselage substantially spherical in form, a tubular wing pivotally mounted on and surrounding said fuselage, a rotor system housed within said wing for creating a blast of air therethrough, and power means in said fuselage for driving said rotor system, said wing and said rotor system being pivotally mounted with respect to said fuselage on a common pivot axis and said pivot axis being disposed transversely to the axis of symmetry of said wing, whereby said wing and said rotor system may pivot as a unit with respect to said fuselage about said common axis.

3. An aircraft comprising a fuselage having a rear portion substantially hemispherical in form, a bulge protruding outward from the lower forward portion of said fuselage, a tubular wing pivotally mounted on and surrounding said fuselage, a rotor system housed within said wing for creating a blast of air therethrough, and power means associated with said aircraft for driving said rotor system, said wing and said rotor system being pivotally mounted with respect to said fuselage on a common pivot axis being disposed transversely to the axis of symmetry of said wing, whereby said wing and said rotor system may pivot as a unit with respect to said fuselage about said common axis.

4. A converti-plane comprising a fuselage, a tubular wing surrounding the fuselage and pivotally mounted thereon and movable about a transverse axis with respect to the longitudinal axis of said wing, and means interconnecting said fuselage and wing for moving said wing from a landing position to a flying position.

5. A converti-plane comprising a fuselage, a tubular wing pivotally mounted on and surrounding said fuselage, and control means extending between the fuselage and the wing whereby said wing may pivot about a transverse axis with respect to its longitudinal axis from a landing position to a flying position.

6. An aircraft comprising a fuselage, a tubular wing pivotally mounted on and surrounding said fuselage, a thrust generating means housed within said wing for creating a blast of air therethrough, and power means associated with said aircraft for operating said thrust generating means, and means operably interconnecting the fuselage and wing for moving said wing about a transverse axis with respect to its longitudinal axis from a landing position to a flying position.

7. An aircraft comprising a fuselage, a tubular wing pivotally mounted on and concentric with said fuselage, a rotor system housed within said wing for creating a blast of air therethrough, and power means associated with said aircraft for driving said rotor system, said wing and said rotor system being movable as a unit with respect to said fuselage, and means operably interconnecting the fuselage and unit for moving said unit about a transverse axis with respect to the longitudinal axis of the wing from a landing position to a flying position.

8. An aircraft comprising a fuselage, a tubular wing symmetrically disposed concentrically with respect to and pivotally mounted on said fuselage, a thrust generating means housed within said wing for creating a blast of air therethrough, and power means associated with said aircraft for operating said thrust generating means, means for moving said wing and said thrust generating means as a unit about a transverse axis with respect to the longitudinal axis of said wing from a landing position to a flying position, and a rotor shaft connected at its outer end to the thrust generating means and pivotally connected at its inner end to said power means.

9. An aircraft comprising a fuselage, a tubular wing pivotally mounted on and surrounding said fuselage, a thrust generating means housed within said wing for creating a blast of air therethrough, and power means associated with said fuselage and operably connected to said thrust generating means, a support means connecting said wing to said thrust generating means whereby said wing and said thrust generating means may pivot as a unit about a transverse axis generally perpendicular to the longitudinal axis of the wing.

10. An aircraft comprising a fuselage having an aft section substantially hemispherical in shape, a tubular wing symmetrically disposed concentrically with and pivotally mounted on said fuselage, said wing being movable relative to said fuselage, and pivoting means interconnecting the wing and fuselage for moving said wing about a transverse axis with respect to its longitudinal axis from a landing position to a flying position.

11. An aircraft comprising a fuselage having a rear portion substantially hemispherical in form, a tubular wing pivotally mounted on said fuselage, a power means associated with said aircraft, a rotor shaft extending from the power means and connected to a rotor system housed within said wing, said rotor shaft and rotor system being pivotally mounted with respect to said fuselage on a common pivot axis and said axis being disposed transverse to the axis of symmetry of said wing, a plurality of supports comprising aerodynamic fins positioned within said wing, the outboard ends of said supports being fixedly attached to said wing, the inboard ends of said supports providing a bearing for the rotor shaft, said fins being aligned radially in a streamlined manner with respect to said wing, control surfaces attached to said fins to provide controlling forces to said aircraft by means of deflecting the flow of air generated by said rotor system.

12. An aircraft comprising a fuselage, a tubular wing, means extending radially from the fuselage and wing pivotally interconnecting the two and positioning the fuselage within the wing, a thrust generating means housed within said wing for creating a blast of air therethrough, and power means associated with said aircraft for operating said thrust generating means, and means for moving said wing about a transverse axis with respect to its longitudinal axis from a generally vertical position to a generally horizontal position whereby the resultant force of said thrust generating means passes substantially through a common point within the central portion of said fuselage regardless of the degree of rotation of said wing with respect to said fuselage.

13. An aircraft comprising a fuselage, a tubular wing pivotally mounted on and surrounding said fuselage, power means on the fuselage, a rotor shaft extending from the power means and connected to a rotor system housed within said wing, said wing, rotor shaft, and rotor system being pivotally mounted with respect to said fuselage on a common pivot axis and said pivot axis being disposed transverse to the axis of symmetry of said wing, a plurality of supports comprising aerodynamic fins aligned radially in a streamlined manner with respect to said wing and intersecting the axis of symmetry of said wing, control surfaces attached to said fins to provide controlling forces to said aircraft by means of deflecting the flow of air generated by said rotor system.

References Cited in the file of this patent

UNITED STATES PATENTS

| | | |
|---|---|---|
| 936,116 | Lee | Oct. 12, 1909 |
| 1,655,114 | Tesla | Jan. 3, 1928 |
| 1,686,080 | Ford | Oct. 2, 1928 |
| 1,720,939 | Wilkin | July 16, 1929 |
| 2,753,005 | Peterson | July 3, 1956 |

FOREIGN PATENTS

| | | |
|---|---|---|
| 1,050,948 | France | Sept. 9, 1953 |